Patented July 9, 1935

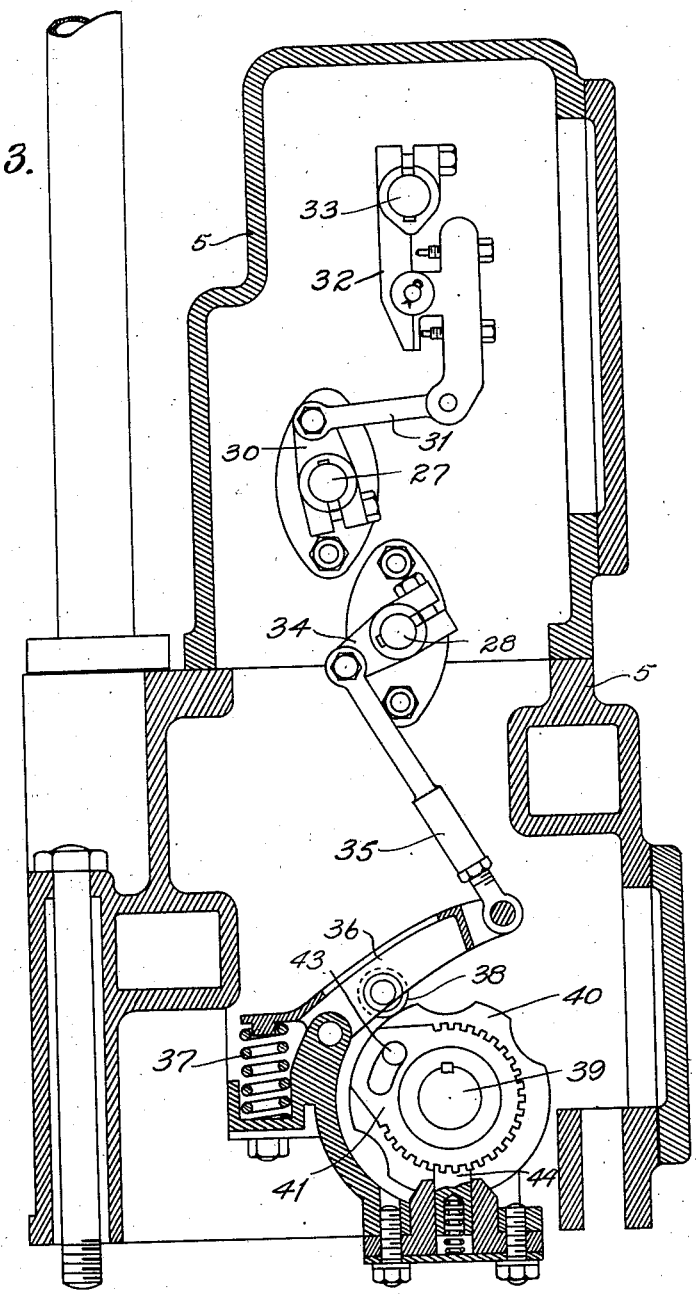

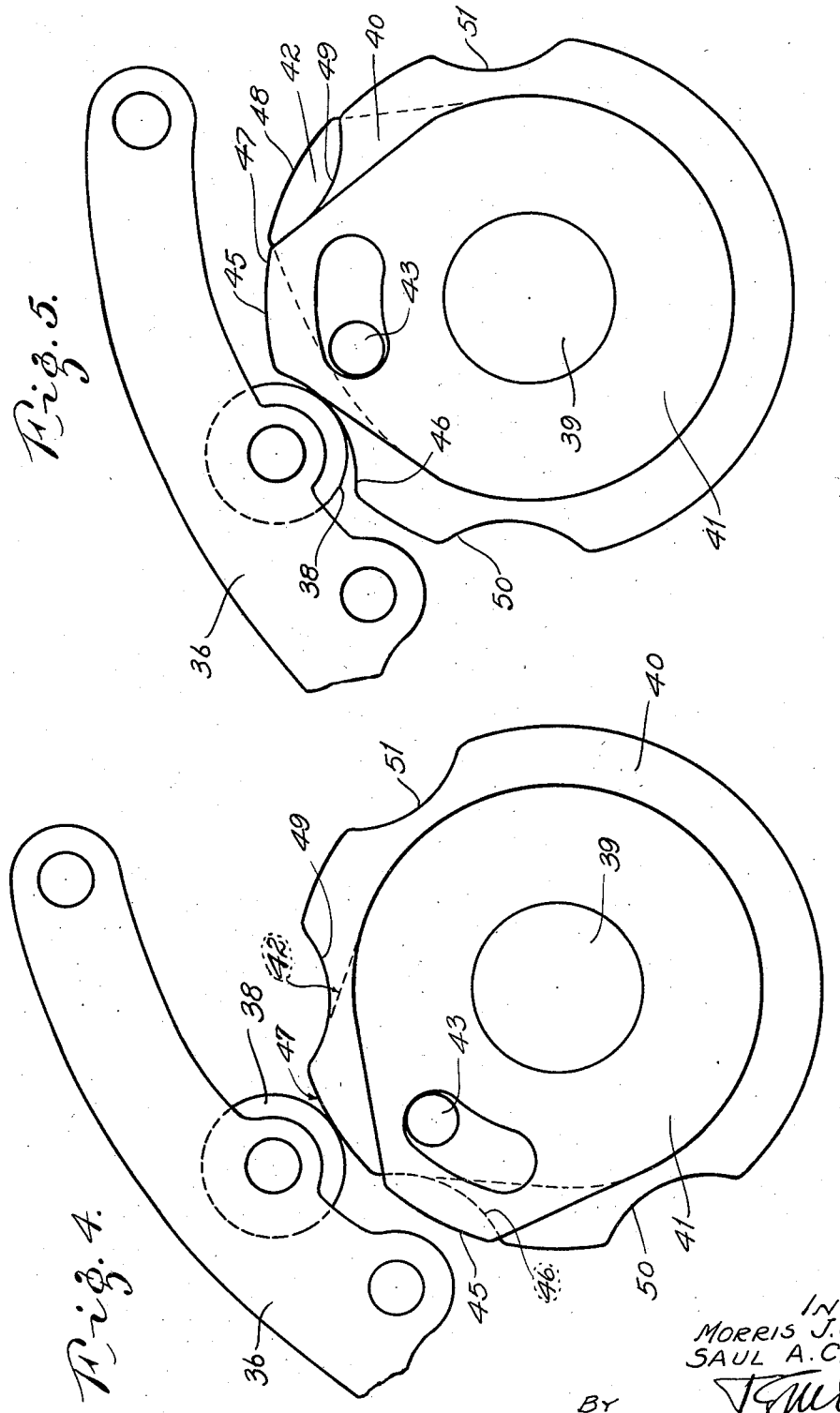

2,007,246

UNITED STATES PATENT OFFICE 2,007,246

FUEL CONTROL MEANS FOR INTERNAL COMBUSTION ENGINES

Morris J. Goldberg and Saul A. Ciechanow, Beloit, Wis., assignors to Fairbanks, Morse & Co., Chicago, Ill., a corporation of Illinois Application April 1, 1927, Serial No. 180,293

6 Claims. (Cl. 123—41)

This invention relates to improvements in fuel control means for internal combustion engines, and especially to improvements in the controls for starting, stopping and timing reversible engines of the high compression solid injection types.

An object of this invention is the provision of means for quickly and permanently changing the timing of push-rod mechanisms, relative to operatively connected cam and rocker assemblies, or equivalent driving means.

A further object is the creation of improved means for rendering operative or inoperative an engine control at a desired time with respect to a group of other controls adapted to be operated in a given sequence.

Another object is an improved, simple and reliable means for effecting a time delay in certain control operations.

A still further object is the creation of an improved fuel cut-out means for use in starting and stopping engines of the described sort, where these operations are to be effected in a fixed sequence of control movements.

Further objects and advantages of our invention will appear from the drawings and the following detailed description.

Although our invention consists largely in the construction and arrangement of parts hereinafter described and particularly pointed out in the claims, yet we do not limit our invention to the precise form or construction of parts shown or the several parts thereof, inasmuch as various alterations may be made without changing the scope of the invention.

Figure 1:
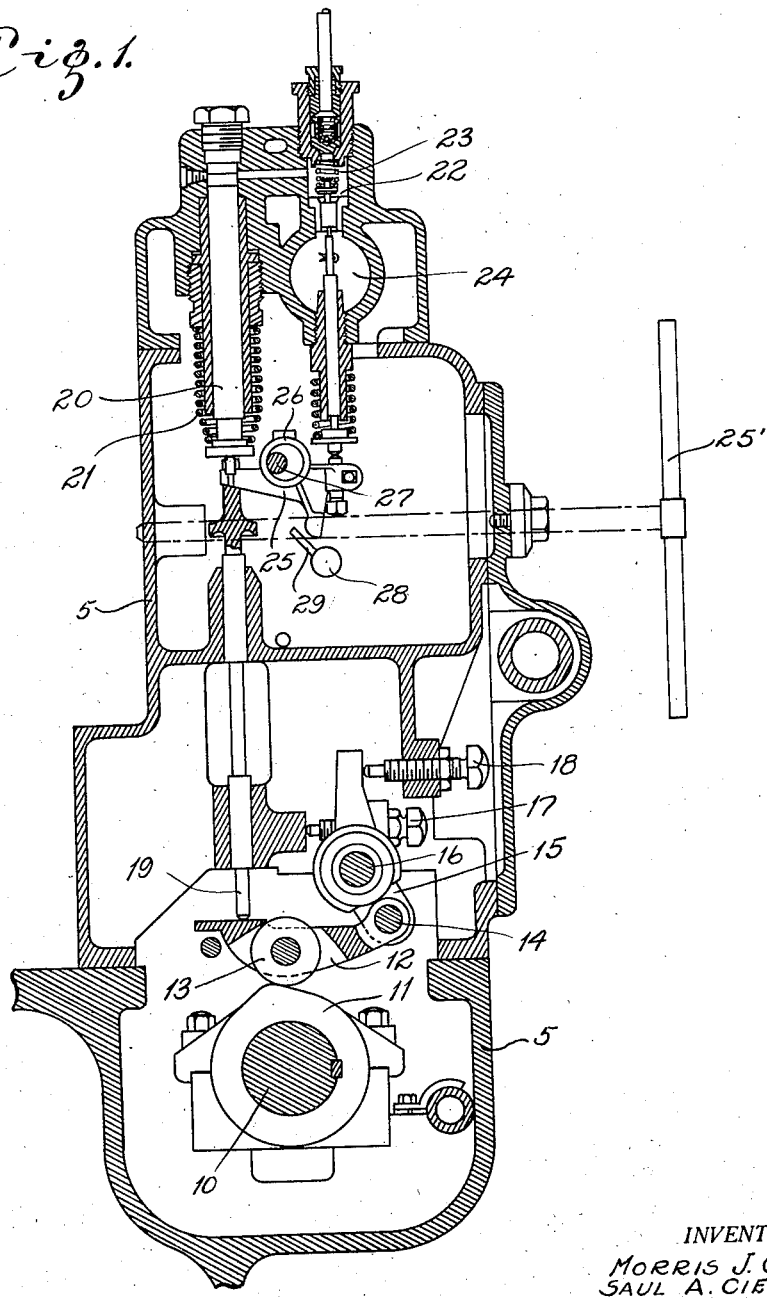
Figure 2:
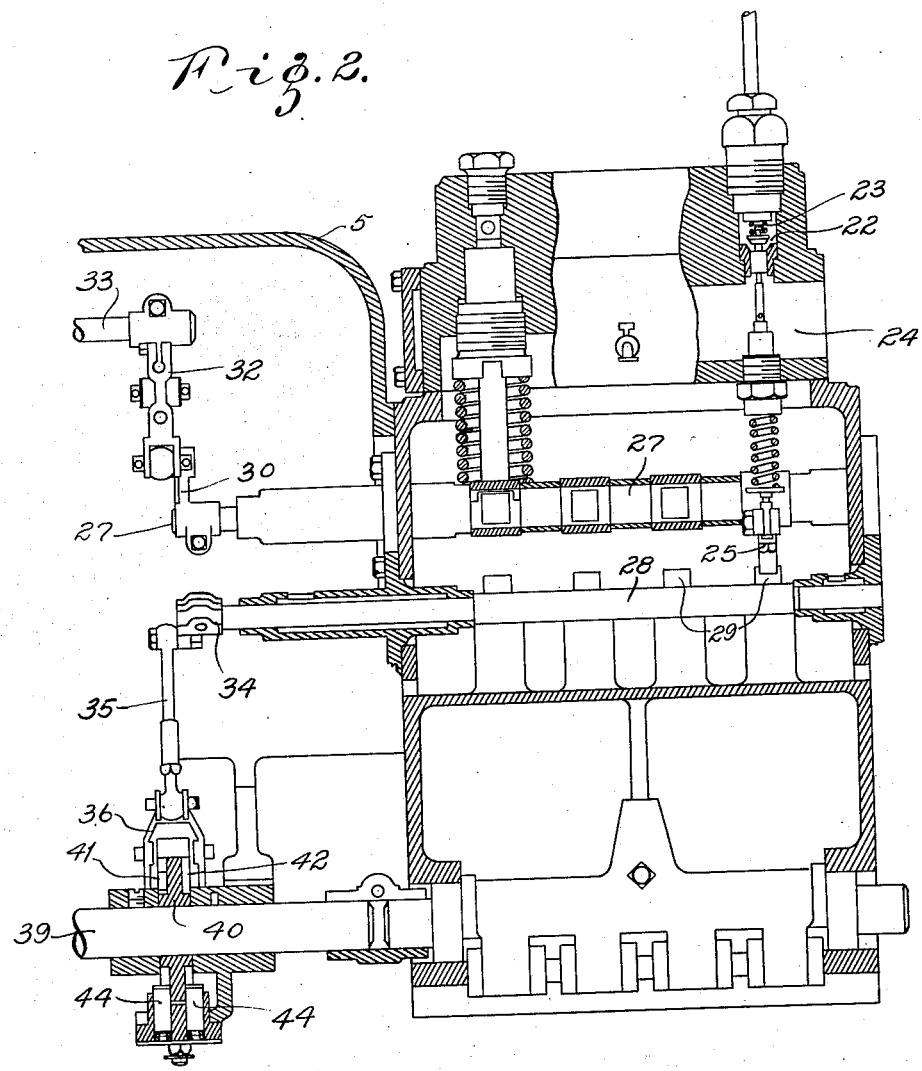
Figure 6:
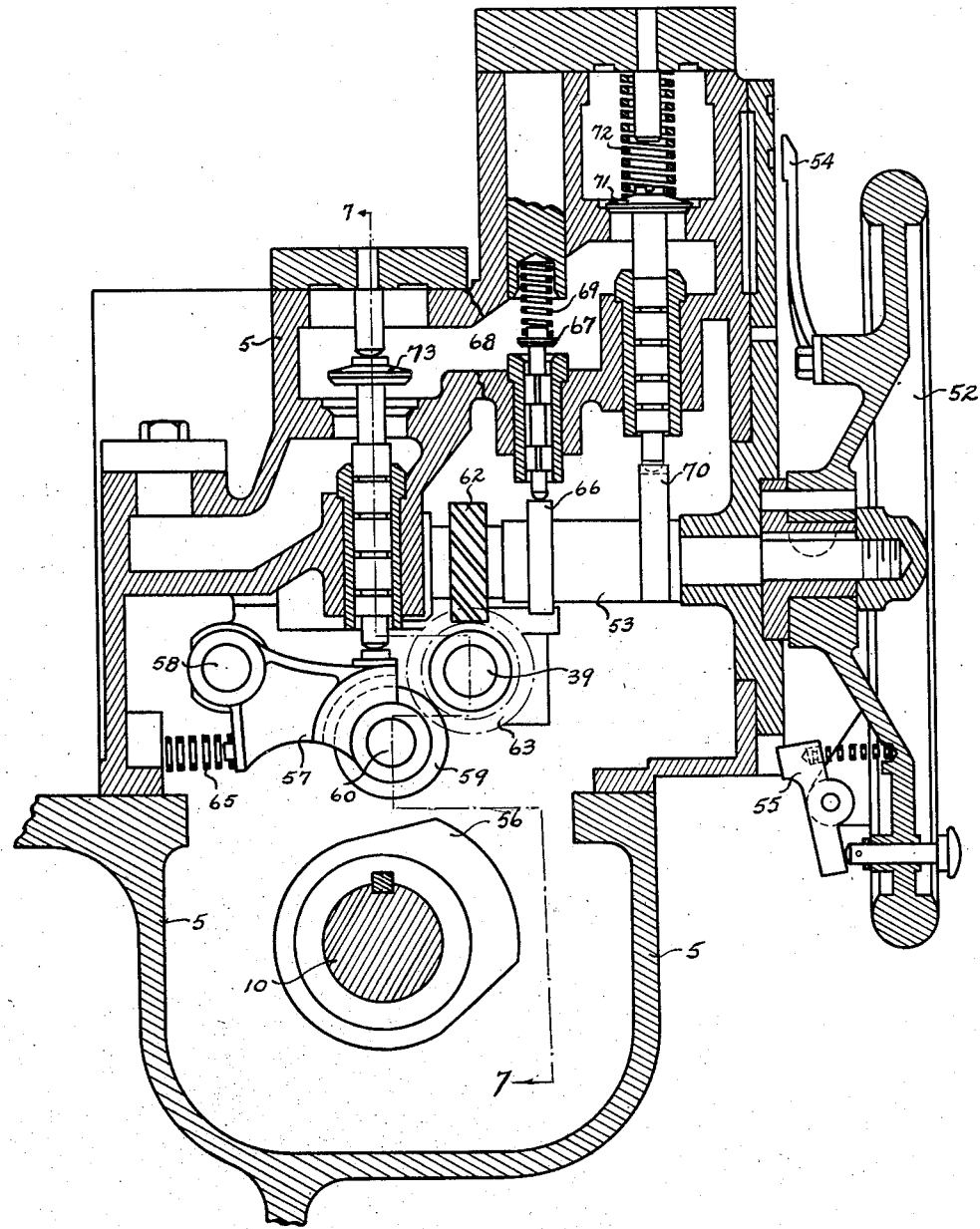
Figure 7:
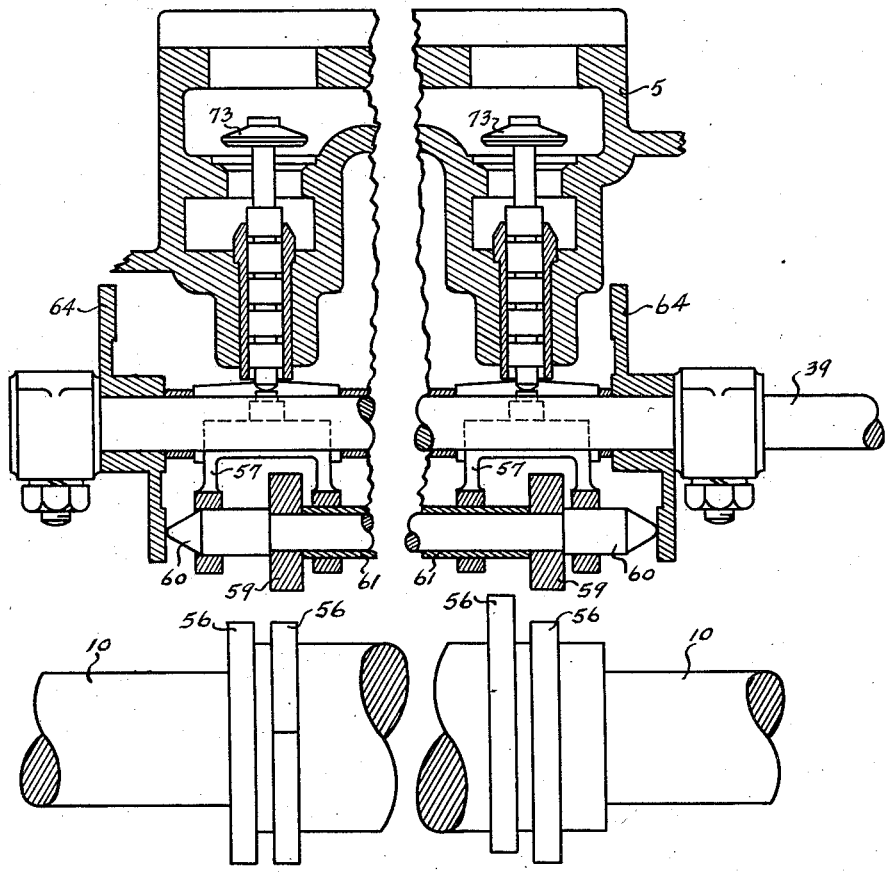
Figures 8, 9:
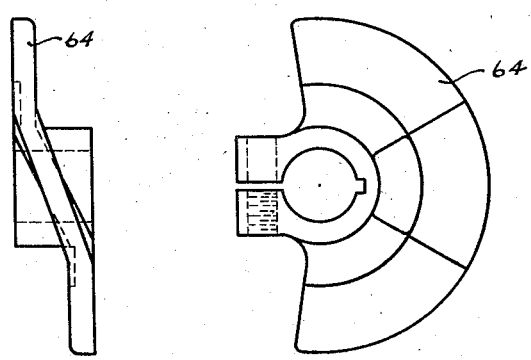

In the drawings, Fig. 1 is a sectional elevation of an approved form of injection pump, for the control of which our invention may be adapted, and showing our improved means for changing the timing of such an apparatus with respect to a driving shaft or other rotating member; Fig. 2 is a side elevation, partly in section, showing the operative connection between the manual control means and the inlet valve of the injection pump and showing a sectional view of our fuel cut-out cam assembly; Fig. 3 is a vertical elevation, partly in section, of an approved connecting arrangement for various parts of the fuel control system; Fig. 4 is a diagrammatic illustration of our fuel cut-out cam assembly in a position to stop the engine by rendering the injection pump inoperative; Fig. 5 is a diagrammatic illustration similar to Fig. 4, except that the cams are shown in a position for normal forward running of the engine. Fig. 6 is a vertical sectional elevation of the control mechanism, showing its relation to a preferred form of air starting and reversing device; Fig. 7 is a fragmentary sectional elevation along line 7—7 of Fig. 6; Fig. 8 is a side elevation of a preferred form of spiral or angular faced cam used in connection with the reversing mechanism; Fig. 9 is an end elevation of the cam appearing in Fig. 8, and Fig. 10 is a fragmentary elevation of a cam-retarding device.

Reference to the drawings is by numerals, and although the description is in the singular, it will be understood that a plurality of like parts may be intended, and that the description may apply to either a single or multi-cylinder engine.

In the drawings, 10 indicates a cam shaft carrying a cam 11 for the purpose of driving the injection pump. Preferably adjacent to cam 11 is a rocker 12 which may be provided with a roller 13 adapted to contact with cam 11. One end of the rocker 12 preferably has a pivoted fulcrum as shown at 14. The other end of the rocker has a comparatively long, horizontal face adapted to contact with a plunger rod 19 for driving the injection pump. The pivoted end of the rocker 12 is preferably supported by a lever 15, which is in turn pivoted at 16 and is adjustable by a pair of set screws or bolts 17 and 18, which permit an easy, permanent setting of the supporting lever 15 to change the timing of the injection pump. An operative connection between rocker 12 and the pump is provided in the plunger rod 19, connected to the plunger 20. A spring 21 tends to hold the rod and plunger in their lowest position. A suction valve 22 is provided for the pump, the valve being retained by a spring 23 which tends to keep the suction valve closed except when actuated as hereinafter described. At 24 is shown a fuel supply conduit or reservoir for supplying the injection pump through the suction valve 22. A rocker 25 is preferably located as shown, mounted on an eccentric fulcrum 26. The eccentric 26 is in turn pivoted on a shaft 27 which may extend to a governor, (not shown) to provide a speed-responsive control over the amount of fuel injected. At 25' we have indicated a priming wrench which may be inserted from the outside of the engine to actuate the rocker 25 to operate the pump, fill the fuel system and facilitate starting of the engine. At 28 is indicated a cut-out control shaft, preferably provided with an arm or projection 29. Upon partial rotation of the shaft 28, the resulting contact between the arm 29 and rocker 25 will hold open suction valve 22, thus terminating the fuel injection and stop the engine.

Instead of extending the shaft 27 directly to a governor, we may provide some such connecting mechanism as that shown in Figs. 2 and 3. Shaft 27 may be provided with an arm 30, connected in turn to a link 31 and a two piece adjustable arm 32. This arm may be adjustably secured to a shaft 33 which is preferably controlled by a governor.

The shaft 28, which serves to open the suction valve to prevent delivery of fuel by the injection pump, is provided with an arm 34 and an adjustable link 35 connected thereto. These members are actuated in turn by a rocker 36, which is kept in operative contact with a cam assembly by a spring 37. The rocker 36 is preferably provided with a roller 38 pivoted thereto as shown.

At 39 is indicated a manually rotatable shaft which carries the fuel cut-out cam assembly. This assembly in the example shown comprises a central cam 40 which may be keyed to shaft 39, as shown, and cams 41 and 42 on either side of central cam 40. The cams 41 and 42 are mounted so as to turn freely on the shaft 39. Each of the free cams is actuated by pins 43 carried by the central cam 40 and extending through a slot in each of the outside cams 41 and 42. Ratchets 44, preferably spring-pressed as shown, serve to prevent any movement of the cams 41 and 42 except when they are impelled by the pins 43 in one extremity or the other of the slots provided in each of the outside cams. The fuel cut-out cam assembly is shown as comprising the three cams 40, 41, and 42. Obviously, any number of cams, each having one or more high points and one or more low points, may be utilized to accomplish a result similar to the example illustrated. Instead of pins 43, suitable projections or lugs may be provided as integral parts of the cams, to serve the same purpose.

The manually controlled shaft 39 may be actuated directly by a hand wheel (such as 52), or may be gear driven or otherwise connected to a separate shaft which is in turn rotated by a hand wheel or lever, such as that shown in Fig. 6, and described in detail in Letters Patent No. 1,900,054 of Morris J. Goldberg and Franz Carl Teufl, granted March 7, 1933.

All or a part of the apparatus described may be enclosed by a housing 5, which may consist of superposed enclosure portions. The housing may be part of the usual engine structure, or an auxiliary enclosure may be provided. The housing may contain a lubricant, for splash or force oiling of the various moving parts. Within the housing 5, or a suitable auxiliary housing, may be provided the starting device, which in the present example, consists of a compressed air arrangement for initially starting the engine, or changing its direction of rotation. For convenience of description and reference, the air start system described in detail in the above mentioned co-pending application, may be briefly set forth for the sake of completeness, and to illustrate our fuel cut-out apparatus as adapted to a completely unified engine control system.

The shaft 10 referred to above in connection with cams 11, for operating the injection pumps, may also be provided with air start cams 56, a pair of which are provided for each cylinder to be supplied with starting air. One of each pair of cams 56 is adapted for a given rotation of the engine, and the other cam of the pair, for the opposite rotation. At 57 are indicated rocker arms of a preferred form, which are pivotally mounted to a stationary part of the housing or engine, as shown at 58. Each of the rockers 57 is provided with a roller 59, which can be shifted axially above the air start cams 56, as desired. By preference the rollers 59 are made separately from the pins 60 on which they are mounted, and the rollers are preferably pressed on, with a collar 61 pressed on after them. The abutting ends of pins 60 are preferably faced perpendicularly to their axes, so as to be in sliding contact with each other. These pins are preferably rotatably mounted in the rocker arms 57, and are also capable of endwise motion.

Connection to a manual control is afforded through a shaft 53, rotatable by a control wheel 52. The control shaft 53 is in turn geared or otherwise connected to the shaft 39, referred to above. The control wheel shaft 53, is preferably manually rotatable in either direction by means of the control wheel. This wheel is provided with suitable means for indicating its control position, for example an indicator 54, which may operate across a suitable dial (not shown). A spring pressed catch 55 serves to position the wheel in its several control positions. Connecting gearing may be provided between the shafts 53 and 39, for example the gears 62 and 63.

The shaft 39 carries a pair of spiral faced cams 64, one at each end of the air start cam assembly. (See Figs. 7, 8 and 9.) The spiral faces of cams 64 are mounted in sliding contact with the outer ends of the pins 60. Sufficient end clearance is provided between the separate pins 60, and between the pins 60 and cams 64, to permit each rocker 57 to oscillate freely in following the contour of the cams 56.

A spring 65 is suitably disposed adjacent each of the rockers 57, and tends to keep the rocker away from the surface of the air cam during normal operation of the engine, and when it is desired to shift the rollers 59 from forward operating position to reverse position. The hand wheel shaft 53 is provided with a cam 66, which serves at times to open a pressure relief valve 67. This pressure relief valve controls communication between an air chamber 68 and the atmosphere. The valve 67 is normally held closed by a spring 69. Mounted on the same shaft, is shown an additional cam 70, which may be a double nosed cam and serves to control the master air starter valve 71. This valve is normally held in its closed position by a spring 72. The air start distributing valves are indicated at 73, and as illustrated may be of a conventional type and actuated directly or indirectly by the cams 56 acting upon the rollers 59 to cause the valves to open in timed relation with the corresponding power cylinders.

The operation of the air start system is thought to be apparent from the above description of its parts. Before starting the engine, the hand control wheel 52 is in a "stop" position, as will be shown by the indicator 54. At this time the master air valve 71 is closed, the relief valve 67 is open, and the rollers 59 are out of contact with the air start cams 56. Upon turning the control wheel to either the ahead or astern position, the same sequence of events takes place as follows: The rollers 59 are shifted to a position above the proper set of cams 56. This shifting is accomplished by means of the rotation of shaft 39, which is gear driven as described, from the shaft 53, and by the action of the spiral faces of cams 64 on the pins 60. At the same time that the rollers 59 are shifted, the relief valve 67 is, due to the movement of cam 66, closed by the spring 69. At once the master air valve 71 is opened, due to the position of cam 70. By preference, the shifting of rollers 59 to the proper set of cams is completed after a few degrees of angular displacement of the control wheel. Upon further rotation of this wheel, the relief valve 67 is closed, and after still further rotation the master air valve 71 is opened to admit the starting air to the chamber 68.

Obviously, some or all of the enumerated steps may be effected simultaneously, or their order changed somewhat without materially affecting the result. The air pressure now present in chamber 68 tends to close all of the valves 73 against the pressure of springs 65, and causes the rollers 59 to ride upon the cams 56. Such of the valves 73 as remain open, permit air to pass to the corresponding power cylinders. Further rotation of the hand control wheel opens the master air start valve 71 to its maximum lift, to admit the full receiver pressure for starting the engine.

At this point in the rotation of the shafts 53 and 39, one of the low points of the cam assembly 40—41—42 is brought under the roller 38, which, as will hereinafter appear, serves to effect delivery of fuel from the injection pumps to each of the power cylinders. As soon as the engine has started, the hand control wheel 52 is turned back to its running position, in which position the injection pump continues to deliver fuel, but the starting air is cut off. Upon movement of the control wheel to running position, the cam 70 permits the master air valve 71 to close, thus cutting off the supply of air from the receiver. The same movement of the control shaft also serves to bring cam 66 to a position to open the relief valve 67, and thus restore the air chamber 68 to atmospheric pressure.

At the same time, the pressure against each of the air distributing valves 73 is relieved, and the springs 65 hold the rollers 59 off of their respective cams, thus putting the entire air starting mechanism out of operation during the normal running of the engine.

It will be understood, of course, that the above described starting events are, in the present example, definitely synchronized with the hand control over the injection pumps. This necessarily follows from the fact that the injection pump is definitely controlled through shaft 39 geared in turn to shaft 53, which is adapted to be manually actuated by the hand wheel.

The operation of our apparatus is thought to be apparent from the foregoing detailed description of parts. The fuel cut-out apparatus herein described may be employed for any control or other purpose wherever there exists a suitable combination of rotating and reciprocating elements.

In Fig. 1 the timing apparatus illustrated in connection with rocker 12 may be adapted to almost any semi-permanent timing adjustment. The rocker 12 may be shifted to the right or left (in Fig. 1) by changing the relative adjustment of set screws 17 and 18 to turn the supporting lever 15 through a small angle about its pivot 16. The setting is secured by means of the lock nuts, as shown. The horizontal face of the rocker 12 which contacts with the plunger rod 19, is made of substantial length to permit a latitude of lateral adjustment of the rocker. The set screw 17 is threaded into the lever 15 and the set screw 18 is preferably threaded into the frame or other stationary member. On engines of the type described the timing of the injection pump is ordinarily at top dead center of the piston and very little adjustment in timing is required. In such cases, however, this adjusting means may be used to good advantage to compensate for slight variations in manufacture existing between individual engines. Such a timing arrangement may be used with or without modifications for practically any cam or rocker mechanism.

In the particular example shown, the cam assembly comprising cams 40, 41, and 42 is adapted for use as a fuel cut-out means in connection with the unified manual control system described above and set forth in detail in the above mentioned co-pending application. As there described, the control system is adapted to effect a complete series of controls in a definite sequence. The operation effecting the closing of the suction valves of the injection pump to admit fuel and start the engine, is in this specific example, the last operation of the sequence of starting controls, and takes place after the admission of starting air to put the engine in motion. The order is, of course, changed for stopping the engine.

Since the injection pump proper is of somewhat conventional design its operation is thought to be obvious to those skilled in the art. On the up stroke of the plunger 20 the suction valve 22 is held open and acts as a by-pass until the rocker 25, which moves with the plunger, permits it to close. After the valve 22 closes, pressure is built up and injection occurs. The amount of fuel required by the engine is, of course, dependent upon the load and is measured by the point of closing of the by-pass, in this case the valve 22. This point of closing is determined by the effect of the governor upon the shaft 27 and the eccentric 26. Rotation of these elements shifts the fulcrum of the rocker 25 to cause the valve 22 to close earlier or later.

When the hand control wheel 52 connected to shaft 39, is in its stop position, the roller 38 rides the high point 47 of cam 40, (see Fig. 4). The rocker arm 36, the link 35, and the arm 34 have turned the shaft 28 sufficiently to cause the projection 29 to engage the suction valve rocker 25 to hold open the suction valve of the injection pump, assuming in the present example that the control wheel is turned in the ahead direction. This causes the cam 40 to turn in a clockwise direction (in Figs. 4 and 5). Cam 41, because of the ratchet, does not rotate until the pin 43 engages the end of the slot in cam 41, and this does not occur until the high point 45 on cam 41 covers the low point 46 on cam 40. The roller 38 is long enough to engage all of the cams, and rides the cam 41 past the low point 46. The low point 46 corresponds to a running position. The fuel is thus kept cut off until the shaft 39 has rotated through such an angle as to permit the roller 38 to reach the low point 50 on cam 40. This preferably does not occur until the hand wheel or control has been rotated through a substantial angle in order to have permitted the other starting events to take place, and to enable the engine to be rotated at a fair speed by its starting means. This low point 50 permits the roller 38 to drop into the starting position. The rocker 36, due to a pressure of the spring 37 is permitted to drop with respect to the cam, and by means of the link 35 and the arm 34 gives a slight anti-clockwise rotation to shaft 28. This disengages the arm 29 from the rocker 25 and permits the injection pumps to operate normally. As soon as the engine begins to fire, the hand control is turned in the opposite direction until roller 38 drops into the low point 46 on cam 40. This low point 46 represents the running position on the cam 40 and serves to cut-in the injection fuel. The cam 41 has cleared the roller 38 in turning to the starting position and because of the ratchet 44 and the lost motion arrangement provided by the cam assembly, it uncovers the low point 46, and the cam 41 does not again come under the roller in returning the elements to the running position.

The engine is stopped by rotating the hand wheel 52 connected with shaft 39 to bring the high point 47 of cam 40, under the roller 38.

In the example shown, the astern operation is accomplished in a similar manner to the above by using the opposite half of the cam 40 together with the cam 42. The high point of cam 42 is shown at 48, and the astern running position of cam 40 is indicated at 49. The astern-starting, fuel-on position is shown by the low point 51.

The fuel cut-out and timing arrangement herein described are devices especially adapted for use on reversible marine engines. It will be seen, however, that the same principles, with or without modification of the apparatus employed, may be extended to the control of any engine having a number of separate controls which it is desirable to operate in a given sequence, or where for any reason it is desirable to effect a given order of these operations, or to effect a predetermined time lag in control movements.

We claim:

1. A coordinated fuel- and air-control system for reversible Diesel engines, including a control shaft for determining the admission of starting air and engine reversal responsively to predetermined placements of the shaft, an injection pump, an injection pump valve movable selectively to permit and prevent operation of the pump, a cam follower, a plurality of control-actuating cam elements mounted on said control shaft, in position to actuate the pump valve through said follower, one of said cam elements being fixed to the shaft, a cam at each side of the fixed cam and provided with a lost-motion connection thereto, each of said cams having relatively projecting uniformly arcuate peripheral portions, and the fixed cam having a plurality of notches or recesses each adapted to receive the follower, and to permit the pump valve to move to engine-running position, certain of said notches corresponding to forward engine-running placements of the control shaft, and other of the notches corresponding to reverse engine-running placements of the shaft, the lost-motion connection between the cams connecting them to cause, upon predetermined movement of the fixed cam, a projection on one of the lost-motion cams to be moved into bridging relation with a forward-running notch on the fixed cam, and to cause the other lost-motion cam, upon a different predetermined movement of the control shaft and fixed cam, to move into bridging relation to a reverse-running recess on the fixed cam.

2. A coordinated fuel- and air-control system for reversible Diesel engines, including a control shaft, control connections for determining the admission of starting air and engine reversal responsively to predetermined placements of the control shaft, an injection pump, an injection pump valve operable selectively to permit and prevent operation of the pump, a cam follower, a cam assembly carried by said control shaft and adapted to act upon said follower, said cam assembly including a plurality of adjacent cams, one thereof being fixed to the shaft, and each of a plurality of the other cams having a lost-motion connection with the first named cam, whereby each of the cams is adapted to assume different positions relative to the others, and the cam assembly adapted to present various predetermined arrangements of operating surface to said follower, the fixed cam having a plurality of depressions each adapted to receive the follower to place the pump-valve in positions coordinated with forward engine operation as determined by the air and reversal connections, the fixedly mounted cam being further provided with other depressions similarly corresponding to pump-valve positions during reverse engine operation, the lost-motion cams being adapted respectively to vary the operating surface of the forward-running, and of the reverse-running portions of the fixed-mounted cam, and means associated with each of the lost-motion cams tending to prevent its movement, except when impelled by the fixed-mounted cam.

3. In a coordinated fuel- and air-control system for a reversible Diesel engine, a control shaft, connections to said shaft for controlling admission of starting air and engine reversal responsively to predetermined placements of the control shaft, an injection pump, a pump valve, a control arm for actuating said valve selectively to permit and prevent operation of the pump, a cam follower connected to the control arm, a cam assembly of variable-profile type mounted on said control shaft, and including a plurality of adjacent cams each adapted to coact with said follower, one of said cams being fixedly mounted on the shaft, and others arranged for limited rotation relative to the shaft and the fixedly mounted cam, a lost-motion connection of pin and slot type between the fixedly mounted cam and each of the other cams whereby the high and low portions of the cams are adapted to assume different positions relative to each other; the fixed cam being provided with a plurality of pump-valve controlling points corresponding to forward-running positions of the engine, and a plurality of similar reverse-running positions, one of the lost-motion cams being connected to the fixed cam so as selectively to vary the profile of the forward-running portion of the fixed cam, the other lost-motion cam being adapted for movement relative to the fixed cam, to vary the profile of its reverse-running portion, all of said cams having high points of uniform arcuate contour formed on a common radius.

4. In combination in a control system providing for coordinated actuation of the air, fuel and reversing controls of a Diesel engine, a control shaft, three cams constituting portions of an operative connection between the control shaft and the engine fuel supply, the cams being mounted in adjacent relation on the control shaft, a cam follower adapted to be engaged by said cams, the intermediate cam being secured to said shaft for movement directly therewith, a plurality of high points and a plurality of low points on the intermediate cam, certain of said low points corresponding to fuel control positions during forward running of the engine, and others of said low points corresponding to other fuel control positions during reverse operation of the engine, pins projecting laterally of the intermediate cam, a slot in each of the outer cams for receiving said pins, the pin-and-slot connections between the cams being so located that the outer cams are normally angularly displaced with respect to each other, and so that one of the outer cams may overlie and bridge the forward-running low points of the intermediate cam, while the other outer cam serves to overlie and bridge the reverse-running low points of the intermediate cam, and means tending to position each of the outer cams, except as impelled by said pins.

5. In combination with a coordinated air, fuel and reversing control system for Diesel engines, a control shaft, a cam assembly for operatively relating the shaft and the fuel control elements, the cam assembly including at least three laterally adjacent cams carried by said control shaft, a cam follower arranged in operative relation to each of the cams of the assembly and so connected to the fuel control elements that when urged outwardly of the cam assembly, it is adapted to cut off the fuel supply of the engine, and when permitted to move toward the axis of the cam assembly the fuel control elements are operative, one of said cams being fixed to the associated shaft and provided with a plurality of spaced follower-receiving points corresponding to fuel-on positions during forward running of the engine, and provided with a further plurality of low points corresponding to fuel-on positions during reverse operation of the engine, an auxiliary cam at one side of the fixed cam, and being adapted to overlie and bridge one of the forward-running low points of the fixed cam, another auxiliary cam on the opposite side of the fixed cam adapted to overlie and bridge a fuel-on position corresponding to reverse-running of the engine, all of said cams being constructed with relatively high areas formed on a uniform radius, and all being coaxially disposed with respect to the said shaft, means operatively interconnecting the auxiliary cams in lost-motion relation to the central cam, and means normally tending to prevent movement of said auxiliary cams responsively to movement of said shaft and fixed cam, except when impelled thereby through the lost-motion connections.

6. In combination with a coordinated air, fuel and reversing control system for Diesel engines, a control shaft, a cam and follower assembly for use with the control shaft, consisting of a plurality of cams carried by the associated shaft, and including a central cam having a plurality of low points adapted to receive the follower when the control shaft is in forward running position, and a plurality of other low points coacting with the follower to provide reverse running positions, an auxiliary cam adapted to overlie the forward-running low points, a second auxiliary cam adapted to overlie the reverse-running low points, a follower common to said cams, a pin projecting from each side of said central cam, each auxiliary cam being provided with a pin-receiving slot, the central cam being secured to said shaft for movement directly therewith, said pin and slot connections coacting to impel the auxiliary cams responsively to movement of the first cam following a preliminary independent movement thereof, the auxiliary cams being normally angularly spaced from each other, but coaxial with the central cam, all of said cams being characterized by high points of uniform arcuate contour, and means normally tending to prevent movement of the auxiliary cams responsively to movement of the central cam.

MORRIS J. GOLDBERG.
SAUL A. CIECHANOW.